(12) United States Patent
Kho (10) Patent No.: US 7,665,043 B2
(45) Date of Patent: Feb. 16, 2010

(54) MENU NAVIGATION AND OPERATION FEATURE FOR A HANDHELD COMPUTER

(75) Inventor: Samuel Kho, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 373 days.

(21) Appl. No.: 10/040,584

(22) Filed: Dec. 28, 2001

(65) Prior Publication Data

US 2003/0122882 A1 Jul. 3, 2003

(51) Int. Cl.
*G06F 3/00* (2006.01)

(52) U.S. Cl. .................. 715/864; 715/779; 715/810

(58) Field of Classification Search ............ 345/810, 345/825, 826, 737, 835, 854, 902, 901, 903; 715/779

See application file for complete search history.

(56) References Cited

U.S. PATENT DOCUMENTS

| | | | |
|---|---|---|---|
| 3,573,376 A | 4/1971 | Bartlett et al. | |
| 4,279,021 A | 7/1981 | See et al. | |
| 4,415,065 A | 11/1983 | Sandstedt | |
| 4,545,023 A | 10/1985 | Mizzi | |
| 4,587,630 A | 5/1986 | Straton et al. | |
| 4,725,694 A | 2/1988 | Auer et al. | |
| 4,799,254 A | 1/1989 | Dayton et al. | |
| 4,916,441 A | 4/1990 | Gombrich | |
| 4,931,783 A * | 6/1990 | Atkinson | 345/163 |
| 4,972,457 A | 11/1990 | O'Sullivan | |
| 5,067,164 A | 11/1991 | Denker et al. | |
| 5,101,439 A | 3/1992 | Kiang | |
| 5,127,041 A | 6/1992 | O'Sullivan | |
| RE34,034 E | 8/1992 | O'Sullivan | |
| 5,189,632 A | 2/1993 | Paajanen et al. | |
| 5,227,614 A | 7/1993 | Danielson et al. | |
| 5,249,218 A | 9/1993 | Sainton | |
| 5,334,824 A | 8/1994 | Martinez | |
| 5,335,276 A | 8/1994 | Thompson et al. | |
| 5,353,334 A | 10/1994 | O'Sullivan | |
| 5,367,563 A | 11/1994 | Sainton | |
| D354,478 S | 1/1995 | Miyaharam | |
| 5,379,057 A | 1/1995 | Clough et al. | |
| 5,392,447 A | 2/1995 | Schlack et al. | |

(Continued)

FOREIGN PATENT DOCUMENTS

CA 2187050 5/1997

(Continued)

OTHER PUBLICATIONS

David Pogue, Palm Pilot: The Ultimate Guide, O'Reilly, 2nd Edition, Chapter 1-4.*

(Continued)

*Primary Examiner*—Ryan F Pitaro
(74) *Attorney, Agent, or Firm*—Mahamedi Paradice Kreisman LLP (57) ABSTRACT

A handheld computer is provided having a housing, a display and a processor. The processor is configured to detect an input corresponding to a menu request, to active a first menu on the display in response to the menu request, process navigation input that causes a menu bar of the active menu to become selectable, and to process selection input for selecting the menu bar when it is selectable. The processor is configured to cancel activation of the menu in response to the menu bar being selected.

12 Claims, 4 Drawing Sheets

U.S. PATENT DOCUMENTS

| | | |
|---|---|---|
| D359,734 S | 6/1995 | Nagele et al. |
| 5,436,960 A | 7/1995 | Campana, Jr. et al. |
| 5,438,611 A | 8/1995 | Campana, Jr. et al. |
| 5,446,759 A | 8/1995 | Campana, Jr. et al. |
| 5,465,401 A | 11/1995 | Thompson |
| 5,479,472 A | 12/1995 | Campana, Jr. et al. |
| 5,485,373 A | 1/1996 | Davis et al. |
| 5,496,992 A | 3/1996 | Madan et al. |
| 5,550,715 A | 8/1996 | Hawkins |
| 5,584,054 A | 12/1996 | Tyneski et al. |
| 5,594,640 A | 1/1997 | Capps et al. |
| 5,625,670 A | 4/1997 | Campana, Jr. et al. |
| 5,631,946 A | 5/1997 | Campana, Jr. et al. |
| 5,640,146 A | 6/1997 | Campana, Jr. et al. |
| 5,640,444 A | 6/1997 | O'Sullivan |
| 5,650,769 A | 7/1997 | Campana, Jr. et al. |
| D385,875 S | 11/1997 | Harris et al. |
| D386,497 S | 11/1997 | Huslig et al. |
| 5,694,428 A | 12/1997 | Campana, Jr. et al. |
| 5,710,798 A | 1/1998 | Campana, Jr. et al. |
| 5,714,937 A | 2/1998 | Campana, Jr. et al. |
| 5,717,725 A | 2/1998 | Campana, Jr. et al. |
| 5,722,059 A | 2/1998 | Campana, Jr. et al. |
| 5,722,064 A | 2/1998 | Campana, Jr. et al. |
| D393,856 S | 4/1998 | Lee et al. |
| 5,742,644 A | 4/1998 | Campana, Jr. et al. |
| 5,745,532 A | 4/1998 | Campana, Jr. et al. |
| 5,751,773 A | 5/1998 | Campana, Jr. et al. |
| D395,300 S | 6/1998 | Yamazaki et al. |
| 5,761,621 A | 6/1998 | Sainton |
| 5,797,089 A | 8/1998 | Nguyen |
| 5,797,098 A | 8/1998 | Schroeder et al. |
| 5,798,759 A * | 8/1998 | Dahl ........................ 345/745 |
| 5,805,633 A | 9/1998 | Uddenfeldt |
| 5,812,117 A | 9/1998 | Moon |
| 5,818,437 A | 10/1998 | Grover et al. |
| 5,819,172 A | 10/1998 | Campana, Jr. et al. |
| 5,825,353 A | 10/1998 | Will |
| 5,825,675 A | 10/1998 | Want et al. |
| 5,854,985 A | 12/1998 | Sainton et al. |
| 5,864,805 A | 1/1999 | Chen et al. |
| 5,884,323 A | 3/1999 | Hawkins et al. |
| D408,021 S | 4/1999 | Haitani et al. |
| D408,030 S | 4/1999 | Richards et al. |
| D409,185 S | 5/1999 | Kawashima |
| D410,486 S | 6/1999 | Takahata et al. |
| 5,938,772 A | 8/1999 | Welch |
| 5,949,408 A * | 9/1999 | Kang et al. ................. 345/169 |
| 5,966,671 A | 10/1999 | Mitchell et al. |
| 5,974,238 A | 10/1999 | Chase, Jr. |
| D416,001 S | 11/1999 | Tal et al. |
| D416,256 S | 11/1999 | Griffin et al. |
| 5,983,073 A | 11/1999 | Ditzik |
| 5,990,872 A | 11/1999 | Jorgenson et al. |
| 6,000,000 A | 12/1999 | Hawkins et al. |
| 6,005,496 A | 12/1999 | Hargreaves et al. |
| 6,006,274 A | 12/1999 | Hawkins et al. |
| 6,022,156 A | 2/2000 | Blish |
| D421,744 S | 3/2000 | Ono |
| 6,040,829 A | 3/2000 | Croy et al. |
| 6,043,760 A | 3/2000 | Laakkonen |
| D423,468 S | 4/2000 | Jenkins |
| 6,049,796 A | 4/2000 | Siitonen et al. |
| 6,052,735 A | 4/2000 | Ulrich et al. |
| 6,058,304 A | 5/2000 | Callaghan et al. |
| 6,067,451 A | 5/2000 | Campana, Jr. et al. |
| D432,099 S | 10/2000 | Loh et al. |
| D432,535 S | 10/2000 | Loh et al. |
| D433,016 S | 10/2000 | Matsuda et al. |
| 6,134,453 A | 10/2000 | Sainton et al. |
| 6,141,540 A | 10/2000 | Richards et al. |
| 6,160,926 A * | 12/2000 | Dow et al. ................... 382/313 |
| 6,169,485 B1 | 1/2001 | Campana, Jr. et al. |
| 6,188,789 B1 | 2/2001 | Marianetti, II et al. |
| D439,232 S | 3/2001 | Ledingham et al. |
| 6,198,783 B1 | 3/2001 | Campana, Jr. et al. |
| 6,204,848 B1 | 3/2001 | Nowlan et al. |
| RE37,141 E | 4/2001 | O'Sullivan |
| D440,959 S | 4/2001 | Wolf et al. |
| 6,219,694 B1 | 4/2001 | Lazaridis et al. |
| D442,156 S | 5/2001 | Lee |
| D443,865 S | 6/2001 | Kim |
| D446,199 S | 8/2001 | Xu et al. |
| 6,272,190 B1 | 8/2001 | Campana, Jr. et al. |
| 6,278,442 B1 | 8/2001 | Griffin et al. |
| 6,288,718 B1 | 9/2001 | Laursen et al. |
| 6,295,372 B1 | 9/2001 | Hawkins et al. |
| 6,295,460 B1 | 9/2001 | Nagel et al. |
| 6,297,795 B1 * | 10/2001 | Kato et al. ................... 345/684 |
| 6,307,548 B1 | 10/2001 | Flinchem et al. |
| 6,310,926 B1 * | 10/2001 | Tore .......................... 375/355 |
| D450,307 S | 11/2001 | Xu et al. |
| 6,317,592 B1 | 11/2001 | Campana, Jr. et al. |
| 6,330,618 B1 | 12/2001 | Hawkins et al. |
| D454,349 S | 3/2002 | Makidera et al. |
| D455,135 S | 4/2002 | Hyun |
| 6,370,518 B1 | 4/2002 | Payne et al. |
| 6,377,685 B1 | 4/2002 | Krishnan |
| D456,805 S | 5/2002 | Ono et al. |
| 6,396,482 B1 | 5/2002 | Griffin et al. |
| 6,397,078 B1 | 5/2002 | Kim |
| 6,421,707 B1 | 7/2002 | Miller et al. |
| 6,452,588 B2 | 9/2002 | Griffin et al. |
| 6,477,482 B1 | 11/2002 | Maupin et al. |
| 6,489,950 B1 | 12/2002 | Griffin et al. |
| 6,549,304 B1 | 4/2003 | Dow et al. |
| RE38,127 E | 5/2003 | O'Sullivan |
| 6,611,254 B1 | 8/2003 | Griffin et al. |
| 6,611,255 B2 | 8/2003 | Griffin et al. |
| 6,611,697 B1 | 8/2003 | Ewing et al. |
| 6,662,244 B1 | 12/2003 | Takahashi |
| 6,665,173 B2 | 12/2003 | Brandenberg et al. |
| 6,725,060 B1 | 4/2004 | Chhatriwala et al. |
| 6,727,916 B1 | 4/2004 | Ballard |
| 6,788,285 B2 | 9/2004 | Paolucci et al. |
| 6,857,105 B1 * | 2/2005 | Fox et al. .................... 715/825 |
| 6,867,763 B2 | 3/2005 | Griffin et al. |
| 6,873,317 B1 | 3/2005 | Griffin et al. |
| 6,874,011 B1 | 3/2005 | Spielman et al. |
| 6,874,037 B1 | 3/2005 | Abram et al. |
| 6,891,529 B2 | 5/2005 | Ladouceur et al. |
| 6,919,879 B2 | 7/2005 | Griffin et al. |
| 6,934,558 B1 | 8/2005 | Sainton et al. |
| 6,957,397 B1 * | 10/2005 | Hawkins et al. ............. 715/856 |
| 6,961,584 B2 | 11/2005 | Leedom, Jr. |
| 7,054,441 B2 | 5/2006 | Pletikosa |
| 7,061,403 B2 | 6/2006 | Fux |
| 7,136,897 B1 | 11/2006 | Raghunandan |
| RE39,427 E | 12/2006 | O'Sullivan |
| 7,155,521 B2 | 12/2006 | Lahti et al. |
| 2001/0027121 A1 | 10/2001 | Boesen |
| 2002/0021311 A1 | 2/2002 | Schecter et al. |
| 2002/0036623 A1 * | 3/2002 | Kano ........................ 345/179 |
| 2002/0058533 A1 | 5/2002 | Nagel et al. |
| 2002/0063738 A1 * | 5/2002 | Chung ........................ 345/810 |
| 2002/0086702 A1 | 7/2002 | Lai et al. |
| 2002/0090934 A1 | 7/2002 | Mitchelmore |
| 2002/0097227 A1 | 7/2002 | Chu et al. |
| 2002/0126097 A1 | 9/2002 | Savolainen |
| 2002/0186262 A1 | 12/2002 | Itavaara et al. |
| 2003/0034987 A1 | 2/2003 | Webb et al. |
| 2003/0123627 A1 | 7/2003 | Pinard et al. |
| 2004/0047505 A1 | 3/2004 | Ghassabian |

| | | |
|---|---|---|
| 2005/0012711 | A1 1/2005 | Paolucci et al. |

FOREIGN PATENT DOCUMENTS

| | | |
|---|---|---|
| EP | 0149762 A1 | 7/1986 |
| EP | 0813328 A2 | 12/1997 |
| EP | 0840934 | 4/1999 |
| EP | 933908 A2 | 8/1999 |
| EP | 1071029 | 1/2001 |
| WO | WO94/10678 | 5/1994 |
| WO | WO94/16408 | 7/1994 |
| WO | WO96/01453 | 1/1996 |
| WO | WO00/65445 | 11/2000 |

OTHER PUBLICATIONS

Basterfield, Daniel, The IBM PalmTop PC110, Jan. 30, 2000, pp. 1-3.*

Microsoft, The Windows Interface An Application Design Guide, 1987, pp. 84-87, Figures 1-6.*

Newton MessagePad Handbook, © 1994 Apple Computer, Inc., 1 Infinite Loop, Cupertino, CA, pp. 14-19, 22 and 23. (www.apple.com).

Blackberry Handheld Installation & Getting Started Guide, © 2002 Copyright by Research In Motion Limited, 295 Phillip Street, Waterloo, Ontario Canada N2L 3W8. Revised Feb. 27, 2003, pp. 39-41. (www.rim.net).

Motorola V60i Wireless Phone User Manual, Personal Communications Sector, Motorola, Inc., 600 North U.S. Highway 45, Libertyville, Illinois (www.motorola.com), pp. 1 and 53. url=http://www.motorola.com/mdirect/manuals/v60i_TDMA_User_Manual_E.pdf.

Motorola Series 60g Wireless Phone User Manual, © 2001 Motorola, Inc., published by the Personal Communications Sector, 600 North U.S. Highway 45, Libertyville, Illinois (www.motorola.com), pp. 1-3.

U.S. Appl. No. 11/769,419, filed Jun. 27, 2007, Webb et al.

"American Programmer", N.Y., American Programmer, Inc. (Dec. 1991), pp. 4-33.

"At Last, Technology Harnesse [sic] One of the Most Powerf [sic] Forces known to Man.", Foster City, GO Corporation, 1991, 14 pages.

"Go Corporation Information Statement", (Nov. 8, 1993), 114 pages.

"IBM Selects Racotek Data/Voice Communications Services to Interface With Touchmobile Product", PR Newswire (Jan. 25, 2993), 2 pages.

"IBM TouchMobile Information and Planning Guide, International Business Machines Incorporated" (Mar. 1993), 20 pages.

"IBM TouchMobile Solution for Data Capture and Communication, Keeping Your Business Moving in the 90's, International Business Machines Incorporated" (Jan. 1993), 13 pages.

"IBM's Touchmobile Helps Field Workers Collect Data at the Touch of a Finger", PR Newswire (Jan. 26, 1993), 2 pages.

AT&T New Release, "NCR Cuts Price of 3170 Notebook Computer 11 to 19 Percent" [online]. (Mar. 8, 1993), Retrieved from the Internet, URL:http://www.att.com/press/0393/930308.nca.html>2 pages.

BlackBerry Desktop Software Installation and Getting Started Guide, Feb. 5, 1999.

BlackBerry Developer's Guide SDK User's Guide Version 2.0 (Data TAC), Jun. 12, 2000.

BlackBerry Handheld Users Guide, Sep. 7, 1999.

Carr, R.M., "The Point of the Pen, Byte" (Feb. 1991, Reprinted), 10 pages.

Choi, H., "First Look: Samsung 1300 Cellphone/PDA", retrieved from internet www.techtv.com, Mar. 28, 2001.

Compaq Product Information, "iPAQ Pocket PC Options", retrieved from internet: www.compaq.com/products/handhelds, Nov. 13, 2001.

Cullen, A., "Getting Started With Your EO Personal Communicator", Mountain View, EO, Inc, 1992, 1993, pp. ii-74.

Cullen, A., "Connecting With Your EO Cellular Module", Mountain View, EO, Inc. 1992, 1993, pp. ii-33.

Cullen, A., "Lookup Guide to the EO Personal Communicator", Mountain View, EO, Inc., 1992, 1993, pp. ii-320.

Handspring Product Information: VisorPhone The Springboard Module that Transforms your Visor into an Extraordinary Phone, (2000).

Handspring VisorPhone Module User Guide, (2001).

Handspring, "Sprint and Airprime Delivery First Wireless CDMA Phone and Data Module for the Handspring Visor", retrieved from internet www.handspring/pr59.jhtml, Aug. 2, 2001.

IBM Technical Disclosure Bulletin: SimpleUser Interface to a Cellular Telephone, retrieved from internet, Oct. 2001.

IBM Technical Disclosure Bulletin: "Inexpensive Personal Digital Assistant", retrieved from internet, Apr. 2001.

Kyocera's Smartphone Series, retrieved from internet www.kyocera-wireless.com, Apr. 2001.

MacNeill, D., "Messaging Card and NewtonMail: We Pick Up and Deliver", On the Go Magazine [online], (Oct. 13, 1993), Retrieved from the internet: <URL:http:www.pencomputing.com/Newton-Notes2.html> 2 pages.

MacNeill, D., "Wireless Newton Technology Goes to Work", On The Go Magazine [online], (Sep. 8, 1993), Retrieved from the Internet: <URL:ttp://www.pencomputing.com/Newton/NewtonNotes1.html> 2 pages.

Maki, K., "The AT&T EO Travel Guide", N.Y., John Wiley & Sons, Inc., 1993, pp. ii-555.

Mossberg, W., "Samsung Embeds Cellphone Inside Palm in New 1300 Device", retrieved from internet http://www.ptech.wsj.com/archive/ptech-20010830.html, Oct. 26, 2001.

Newspaper Article: "Ways to Escape Multiple-Remote Hell", San Jose Mercury News, Jun. 14, 2001.

Nokia 9110 Accessories Quick Guide Instruction Manual.

Schlender, B.R., "Hot New PCs That Read Your Writing", Fortune (Feb. 11, 1991, Reprinted). 6 pages.

Sprint PCS User Guide—Samsung Model SCH-8500.

Stock, R., "The World of Messaging, An Introduction to Personal Communications", Mountain View, EO, Inc. 1992, 1993, pp. ii-69.

SyncML Sync Protocol, version 1.0.1., 201, pp. 2-61.

SyncML Website Introduction Page, SyncML Initiative LTD., [Retrieved on Oct. 24, 2002]. Retrieved from the Internet: <URL:http://www.syncml.org/about-intro.html>, 2 pages.

SynML Sync Protocol [Retrieved on Dec. 7, 2000]. Retrieved from the Internet: <URL:http://www.syncml.org/docs/syncml_protocol_v10_20001207.pdf, 60 pages.

Tam, P., Palm, Motorola to Make PDA Cell Phones, retrieved from internet http:www.zdnet.com/zdnn/stories/news/0,4586,2631800,00.html, Sep. 25, 2000.

Technical White Paper BlackBerry Enterprise Server for Microsoft Exchange, Version 2.1, (2001).

Technical White Paper BlackBerry Enterprise Edition for Microsoft Exchange, Version 2.1, (2001).

Tucows PDA Phone GSM Dailer: GSM Dailer 1.0 retrieved from internet http://pds.rcp.net/pe/pocket/preview 154208.html, Jun. 19, 2001.

United States Court of Appeals for the Federal Circuit: *Wireless Agents LLC* v. *Sony Ericsson Mobile Communications AB and Sony Ericsson Mobile Communications (USA), Inc.*, Decided Jul. 26, 2006, 7 pages.

User's Guide, hp iPAQ Pocket PC h4000 Series, Document Part No. 343434-001, Aug. 2003, 141 pages.

Wireless Application Protocol, Service Loading, WAP-168-ServiceLoad-20010731-a, Version Jul. 31, 2002, 18 pages.

Wireless Application Protocol, Service Indication, WAP-167-Servicelnd-20010731-a, Version Jul. 31, 2001, 28 pages.

Wireless Application Protocol, Push Message, WAP-251-PushMessage-20010322-a, Version Mar. 22, 2001, 14 pages.

Wireless Application Protocol, WAP-Sync-Spec, Data Synchronisation Specification, WAP-234-SYNC-20010530-a, Version May 30, 2001, 11 pages.

Wireless Application Protocol, Wireless Markup Language Specification Version 1.3, WAP WML, WAP-191-WML, Feb. 19, 2000, 110 pages.

* cited by examiner

MENU NAVIGATION AND OPERATION FEATURE FOR A HANDHELD COMPUTER

FIELD OF THE INVENTION

The present invention relates to handheld computers. In particular, the present invention relates to a menu navigation and operation feature for a handheld computer.

BACKGROUND OF THE INVENTION

Handheld computers and other portable computing devices require considerable amount of user-interaction. Because such devices are small, user-interface features on a handheld computer are typically incorporated into a compact arrangement of buttons and display features. Display features on the handheld computer are usually contact sensitive. The contact-sensitive nature of the display provides users with a rich and diverse means by which input can be entered and viewed.

One type of graphic user-interface feature on handheld computers is a menu. Menus are favorable because they allow multiple functions to be selectable for a user. Furthermore, the menu items are hidden on the display until the user makes a selection to see the menu. When hidden, the menu occupies a limited amount of space, thereby preserving space on the handheld computer's display.

Typically, a user of a handheld computer can activate a menu by tapping the handheld computer's display. From there, the user may make contact with the display in order to make a menu choice. Once the menu choice is made, the menu typically disappears. If no choice is made, the user has to cancel activation of the menu. Some handheld computers, such as those described below, enable users to navigate menu items using buttons, rather than operating the contact-sensitive display.

Some handheld computers let users cancel activation of menus by letting the user tap the display in a location away from the active menu and its displayed items. This manner of menu cancellation is similar to how desktop computers can deactivate a menu by using a pointer device to click away from a displayed active menu.

One general consideration for handheld computers is to limit the number of times a user is required to tap or make contact with the display. The reason is that contact with the display requires some effort by the user in holding a stylus, and positioning the stylus in the correct position on the display to enter input.

Some handheld computers provide features that substitute for display-tapping when canceling an active menu. For example, the SONY CLIE, manufactured by the SONY CORP., has a jog dial to navigate menu items, and a button dedicated to canceling menus. The BLACKBERRY, manufactured by RESEARCH IN MOTION, displays a cancel feature as a menu item when a menu is activated.

The COMPAQ IPAQ and some other POCKET PC devices allows users to navigate vertically when menus are selected to be active on the display. In order to cancel the active menu, the user has to make contact with the display again.

SUMMARY OF THE INVENTION

A handheld computer is provided having a housing, a display and a processor. The processor is configured to detect an input corresponding to a menu request, to active a first menu on the display in response to the menu request, to process navigation input that causes a menu bar of the active menu to become selectable, and to process selection input for selecting the menu bar when it is selectable. The processor is configured to cancel activation of the menu in response to the menu bar being selected. One or more actuatable mechanisms may be provided on the housing to provide the navigation and selection input.

In another embodiment, the handheld computer includes a set of actuatable mechanisms. A processor is configured to associate an application to each mechanism so that, in response to one of the mechanisms being actuated, the processor executes the application assigned to that mechanism. The processor is configured to display a plurality of menu items that comprise the menu in response to detecting a user-input request. After the user-input request is made, the processor is configured to assign a menu function to each mechanism. While a menu is maintained active on the display, the processor is configured to process input corresponding to actuation of any one of the mechanisms as navigation or selection input. In one embodiment, the processor is configured to navigate and select amongst menus and displayed menu items based on the menu function assigned to each actuated mechanism.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Embodiments of the invention describe a menu navigation and operation feature for a handheld computer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

According to an embodiment, a handheld computer is configured to enable menu navigation and cancellation using actuatable mechanisms provided on a housing of the handheld computer. In particular, a handheld computer is provided having a button set or other mechanical actuatable mechanism that can be used to navigate amongst menus and menu items, select menu items, and select to cancel the activation of a menu.

Among other advantages, embodiments of the invention avoid the use of buttons that are dedicated to perform menu selection functions. In particular, there is no need for a dedicated menu cancellation button or graphical menu item that has no other function other than to cancel an active menu. Rather, one embodiment of the invention enables users to cancel an active menu using navigation and selection input that would otherwise be used to navigate menus and select menu items. Another embodiment of the invention assigns menu functions, including a menu cancellation function, to one or more buttons that are assigned other functions when menus are not active.

In addition, embodiments of the invention avoid the need of placing a cancellation function as menu item in an active menu. This conserves space for displaying other menu items. Furthermore, embodiments of the invention do not require the user to scroll among additional menu items in order to select the cancel menu function whenever the user wishes to cancel an active menu. As a result, embodiments of the invention avoid having to dedicate available display space on a compact housing for menu items that cancel active menus.

In one embodiment, the handheld computer includes a display and a processor. The processor is configured to activate a menu on the display in response to a user-input request. The activated menu includes a menu bar and a plurality of menu items. The processor is configured to receive navigation input to cause the menu bar to become selectable. The activated menu can be cancelled if the menu bar is subsequently selected with selection input.

The term "menu" refers to a virtual or graphic user-interface feature having a menu bar and one or more menu items. The menu bar is a portion of the menu that appears on the display, regardless of whether its menu is active or not, whenever a page or application carrying that menu is active on the handheld computer. The menu bar may provide an identifier of that menu. Often, the menu bar is static, and an activated menu appears to extend menu items from the menu bar. The menu bar generally does not occupy additional space on the display when its menu is made active. Each menu item is associated with an action that is to be performed by the handheld computer. The menu items may be displayed at one time in order to enable users to select at least one of the menu items in order to cause a corresponding action to be performed by the handheld computer.

An "activated menu" is a menu having menu items that are displayed for the user.

As used herein, the term "navigate" means to sequentially indicate a series of display objects as selectable in response to a user-input that indicates a direction. Display objects may be indicated as being selectable through color or shading variation, such as created through highlighting the display object. "Navigation input" is user-input for navigating. Display objects may have a visual, sequential arrangement when appearing on the display. Navigation input can make objects in the arrangement selectable according to a sequence defined by the arrangement of display objects.

A "selectable" menu item is an item, such as a menu bar or menu item, that is visually differentiable from other menu items in the same menu, so that subsequent selection input causes an action associated with that menu item to be performed.

According to an embodiment, selection input entered while one of the menu items is selectable causes an action to be performed by the handheld computer. Selection input entered while the menu bar is selectable may cause the menu to be cancelled.

The terms "user-interactive feature" and "actuatable mechanisms" refer to devices or features that enable users to enter navigation and/or selection input. In an embodiment, user-interactive features are actuatable to cause discrete inputs to be entered. Therefore, actuation of the user-interactive feature causes a static input value to be entered, and variations to the input value require repeating actuation of the user-interactive feature. Examples of user-interactive features include buttons, joy pads, joy-sticks, display icons, and rotating bezels.

B. Handheld Computer with Menu Feature

FIGS. 1A-1D illustrate a handheld computer with a menu feature, under an embodiment of the invention. The menu feature enables the user to cancel an active menu using a combination of navigation and selection input.

Figure 1A:
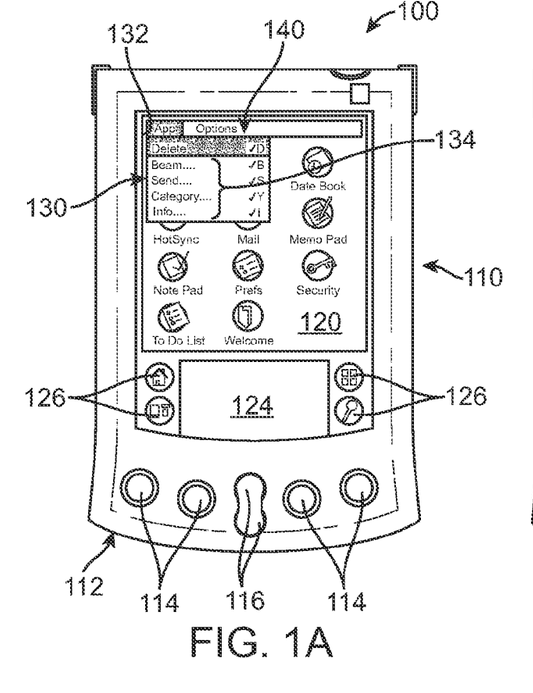
FIGS. 1A-1D illustrate operations of a graphic menu feature on a handheld computer, under an embodiment of the invention.

In FIGS. 1A, a handheld computer 100 includes a housing 110 having a front panel 112. The front panel 112 includes a plurality of application buttons 114, and one or more navigation buttons 116. A display 120 is provided on the front panel 112 of the housing 110. Part of the display 120 may form a dedicated input area 124. The dedicated input area 124 may interpret handwriting type strokes made through contact with display 120 as input. The dedicated input area 124 may also provide icons 126, or similar user-interactive features, that are actuatable like buttons. In some embodiments, dedicated input area 124 does not display information, but receives input through contact with its surface.

Examples of handheld computer 100 in commercial form include electronic organizers operating a PALM OS, manufactured by PALM INC. Examples of such devices include PALM V, PALM VII, PALM m100 and PALM m505 organizers. Other examples of such devices include organizers that use WINDOWS POCKET PC operating system, manufactured by MICROSOFT CORP. Examples of such devices include the COMPAQ IPAQ, manufactured by COMPAQ INC.

The handheld computer 100 is operable to display menus. On the interface shown in FIG. 1A, handheld computer 100 may be operated to select one of two menus. An application menu 130 is shown as being active on display 120. An option menu 140 is not active, but can be made active with user-input. Both the application menu 130 and the option menu 140 are available for activity as part of the home page. The application and option menus 130, 140 may be made unavailable if the page, or an application providing the page is changed.

The application menu 130 includes a menu bar 132, and a plurality of menu items 134. The menu bar 132 and the plurality of menu items 134 are individually selectable to cause the handheld computer 100 to perform a function.

The application buttons 114 are used to operate applications. In one embodiment, each application buttons 114 is associated with an application. The handheld computer 100 can be operated from a sleep or low-power mode into launching one of the applications associated with the corresponding application button 114. A description of this feature is provided in U.S. Pat. No. 5,900,875, and in U.S. patent application Ser. No. 09/272,979, and both of the aforementioned patent and patent application are incorporated by reference in their entirety by this application. In one embodiment, when handheld computer 100 is in a powered state, application buttons 114 are actuatable by a user to enter selection input. In another embodiment, application buttons 114 may be converted when one of the menus is made active so as to provide navigation information when selected.

In one embodiment, navigation buttons 116 may be used to enter navigation information corresponding to an upward or downward direction relative to display 120. Other embodiments may provide for a multi-directional pad or element, instead of navigation buttons 116, that can be actuated in multiple directions. Examples of such devices include a 4-, 5- or 8-way multi-directional pad or joy-stick.

According to one embodiment, in order to effect a cancellation of the application menu 130, the user enters navigation input to cause the menu bar 132 to become selectable. In one embodiment, application menu 130 can be scrolled vertically to cause the menu bar 132 to become selectable.

Figure 1B:
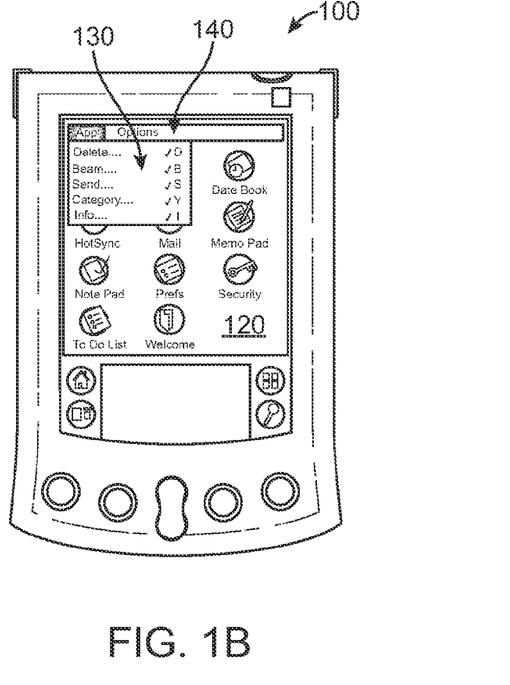

FIGS. 1A-1B together illustrate an example of making the menu bar 132 of application menu 130 selectable using vertical navigation input. In FIG. 1A, application menu 130 is active, with one of the menu items 134 ("delete") being indicated as selectable. FIG. 1B illustrates handheld computer 100 in a state where the menu bar 132 is selectable. The menu bar 132 is made selectable after receiving a discrete, upward navigation input from when the menu item 134 labeled "delete" is indicated as being selectable. In an embodiment, when the menu bar 132 is made selectable, none of the other menu items 134 in the application menu 130 are indicated as being selectable. Rather, only menu bar 132 is highlighted. This state corresponds to menu bar 132 being selectable. If selection input is entered when the menu bar 132 is selectable, the application menu 130 is cancelled. In an example provided, the upward navigation input may be received from the upward navigation button 116 being actuated. The selection input may be received from one or more of either the navigation buttons 116 or application buttons 114 being selected.

Figure 1C:
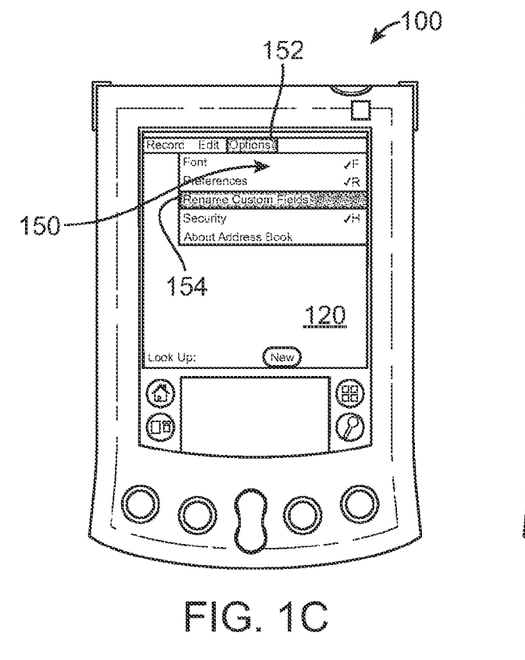
Figure 1D:
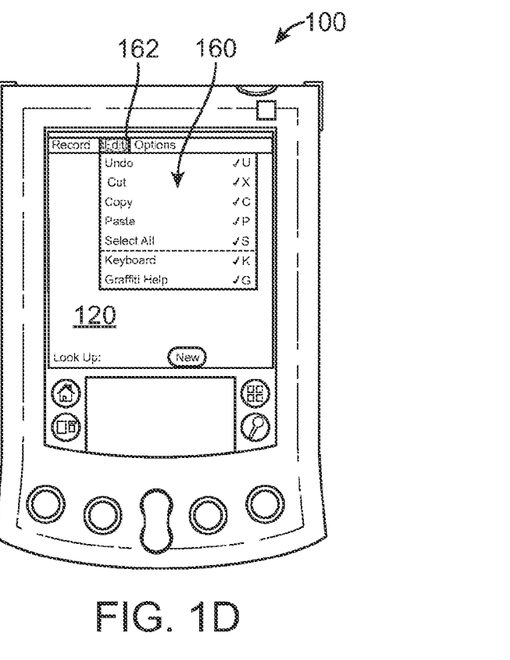

FIGS. 1C-1D show cancellation of a menu, according to another aspect of the invention. In FIG. 1C, an option menu 150 is active on display 120 and includes a menu bar 152 and a list of menu items 154. One of the menu items 154 ("Rename Custom Fields") is indicated as being selectable.

According to an embodiment, a user can navigate to an adjacent menu, such as to an edit menu 160, shown in FIG. 1D. FIG. 1D illustrates lateral navigation from option menu 150 to an edit menu 160. In lateral navigation, an adjacent menu is made active in place of another menu that had been active. According to an embodiment, the menu bar of the menu that was just made active is immediately made selectable. Therefore, the firsts selection that can be made when a menu is made active as a result of lateral navigation is menu cancellation.

For example, in FIG. 1D, a discrete lateral navigation input from one of the application buttons 114, or from a multi-directional navigation member (not shown), causes (i) edit menu 160 to become active instead of option menu 150, and (ii) menu bar 162 of the edit menu 160 to be made selectable. In other words, when lateral navigation is used to move from one menu to another menu, the first item made selectable in the new menu is its menu bar. The user can enter selection input to cause the menu bar 162 of the edit menu 160 to be selected. This causes the edit menu 160 to be cancelled from activation on display 120. Then, no menus are active on display 120.

The effect is that a user can cancel any selected menu at a particular time using two discrete inputs. First, the user enters navigation input to select a new menu to be active (i.e. select edit menu 160 from option menu 150). Next, the user enters a discrete selection input to select the menu bar of the new menu. For example, a user may cancel activation of option menu 150 by entering lateral navigation input to make edit menu 160 active instead of the option menu. Since the lateral navigation input causes menu bar 162 of edit menu 160 to be immediately selectable, selection input causes selection of menu bar 162. Selection of menu bar 162 cancels activation of the edit menu 160, which had replaced option menu 150.

Therefore, embodiments of the invention provide two ways a user can operate user-interactive features such as application buttons 114 or navigation buttons 116 to cancel an active menu. First, the user can select to navigate vertically from one of the menu items in the menu to the menu bar. The menu bar is then selected to cancel that menu from being active.

Second, the user can select to navigate laterally from one of the menu items in an active menu to the menu bar of an adjacent menu, causing the adjacent menu to become active. Once the adjacent menu is made active, selection of that menu's bar will in effect cause activation of that menu to be cancelled. The end result is that both menus become cancelled.

In a variation to the second embodiment, some applications executed on the handheld computer only provide for one menu to be available for a given page being displayed. Therefore, lateral navigation cannot activate second menu. Accordingly, an embodiment provides that when only one menu is available and active, lateral navigation makes the menu bar of that menu selectable. Subsequent selection of the menu bar causes that menu to be cancelled. Alternatively, lateral navigation when the only available menu is active may cancel that menu altogether.

C. Method for Canceling Active Menu

Figure 2:
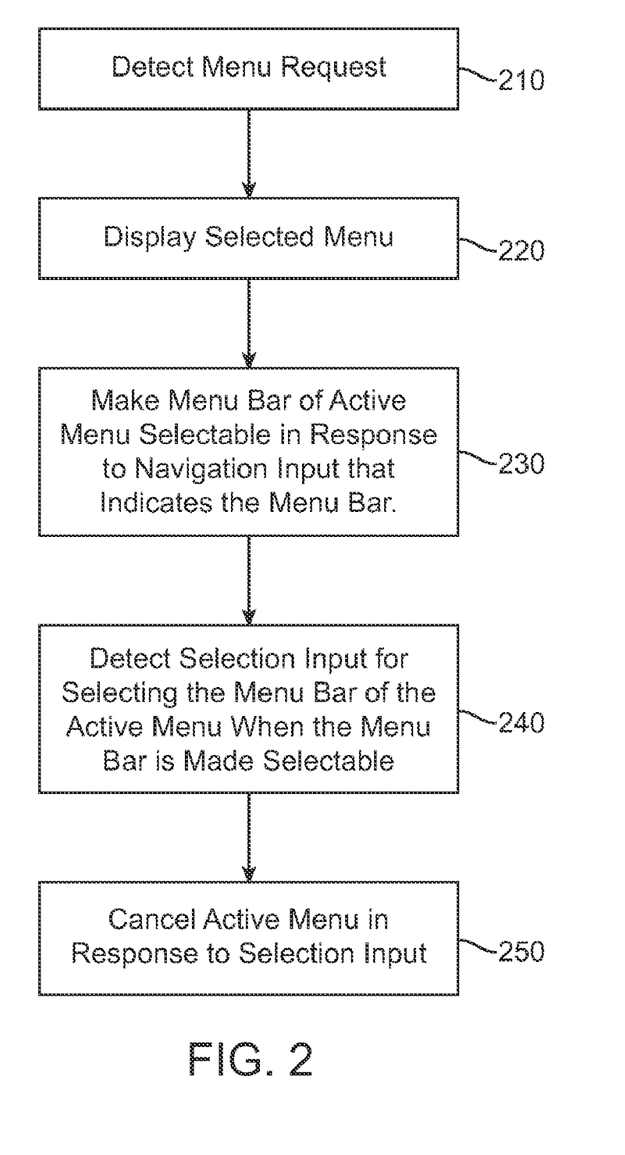
FIG. 2 illustrates a method for canceling an active menu on a handheld computer, under an embodiment of the invention.

FIG. 2 illustrates a method for canceling an active menu, under an embodiment of the invention. Reference to numerals of FIGS. 1A-1D and FIG. 4 is intended to illustrate exemplary components for use with an embodiment of the invention.

In step 210, a menu request is detected by the handheld computer 100. The menu request may correspond, for example, to a user tapping the display 120, in a region where a display object is provided that corresponds to that menu.

In step 220, the selected menu is displayed on display 120 in response to the menu request. In more detail, processor 440 (see FIG. 4) may interpret the input from display 120 as a request to display a particular menu, and then output that menu on display 120 in response to the request. For example, an application menu 130 (FIG. 1) may be displayed having a plurality of menu items 134 and a menu bar 132, in response to the user tapping the menu bar 132.

In step 230, the menu bar of the active menu is made selectable in response to navigation input that selects the menu bar to be selectable. The menu bar of the active menu may be made selectable in response to pre-determined navigation input from mechanical user-interactive features, such as buttons.

According to one aspect of the invention, the navigation input corresponds to the user actuating navigation buttons 116 to scroll amongst active menu items vertically, upward or downward, until the menu bar for that menu is selectable. The navigation input may be a series of discrete input values, such as provided by repeated button presses. In response to each discrete navigation input, the processor (FIG. 4) displays back to the user an indication of which menu item is made selectable, until the menu bar of that active menu is made selectable.

Thus, navigation input causes the menu bar to become selectable in an order determined by the arrangement of the menu items. For example, when the application menu 130 is made active, the menu bar 132 of application menu 130 becomes selectable after "delete" is made selectable, in response to a discrete, upward navigational input. Similarly, if downward navigation input is received, then the menu bar 132 becomes selectable after "Info" is made selectable, in response to a discrete, downward navigational input.

According to another aspect of the invention, the navigation input may correspond to lateral navigation input for selecting an adjacent menu to replace the active menu. For example, the user may have the option menu 150 (FIG. 1C) active, but navigate to the left to the edit menu 160 (FIG. 1D). This causes the menu bar 162 of the edit menu 160 to become active. The lateral navigation input may be provided by the user actuating a multi-directional member, such as a joy pad or stick. Alternatively, as described with FIG. 3, application buttons 114 may be re-assigned to cause processor 440 (FIG. 4) to perform menu functions corresponding to lateral navigation when the application buttons 114 are actuated, and when one of the menus is active.

In step 240, selection input is detected for selecting the menu bar of the active menu when that menu bar is selectable. The selection input may correspond to actuation of a designated one of the application buttons 114. Alternatively, one of the navigation buttons 116 may be pressed centrally in order to effect a selection.

In step 250, the active menu is cancelled in response to the selection input being detected when the menu bar is selectable. A cancelled menu will be mostly hidden on display 120. It is possible for portions of the menu to be present even after the menu is cancelled. For example, the menu bar for each menu of a page or application may be static, so as to be present whenever that application or page is executed or otherwise provided on the display of the handheld computer.

Among other advantages provided by embodiments such as described with FIG. 2, users can cause selected menus to be cancelled on handheld computers without having to touch the display again. Rather, the user may rely on a combination of navigation and selection input to make the cancellation. The navigation and selection input may be made through the use of navigation buttons 116, and/or application buttons 114.

D. Operating and Canceling Menus Using Buttons and other Mechanisms

Figure 3:
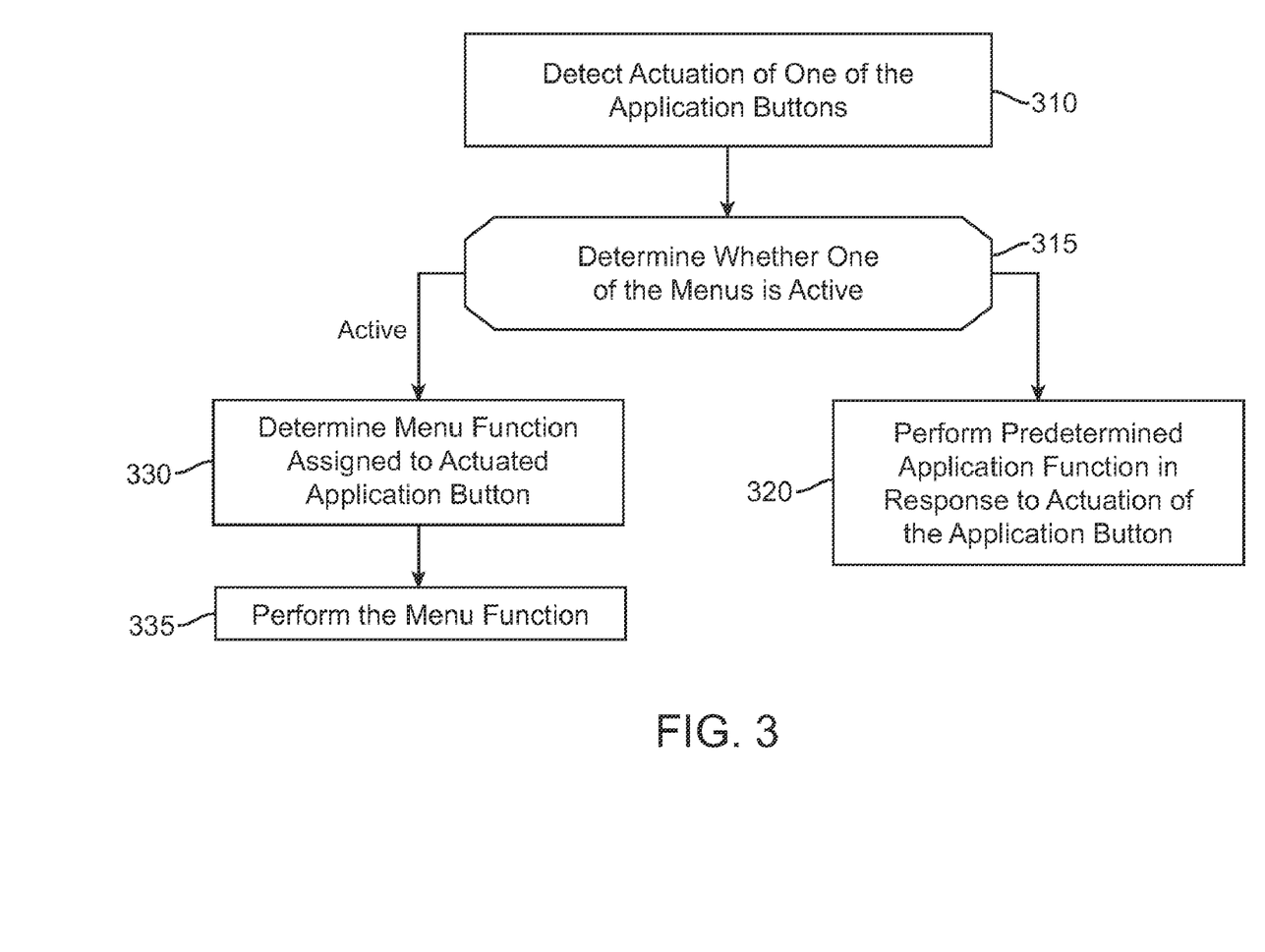
FIG. 3 illustrates a method for enabling a user to interact with an active menu, under an embodiment of the invention.

FIG. 3 illustrates a method for canceling an active menu, under an embodiment of the invention. Reference to numerals of FIGS. 1A-1D and FIG. 4 is intended to illustrate exemplary components for use with an embodiment of the invention.

In step 310, actuation of one of the application buttons 114 is detected.

In step 315, a determination is made as to whether one of the menus is active.

If in step 315 the determination is that a menu is not active, then actuation of the application button 114 causes the handheld computer to perform a predetermined application function in step 320. In one embodiment, the predetermined application function is to execute a pre-assigned application whenever the application button is pressed. For example, handheld computer 100 may correspond to an electronic organizer, and each button may correspond to an application relating to personal management. Examples of applications include electronic calendars, address books, and memo pads.

In one embodiment, actuation of one of the application buttons 114 when the handheld computer 100 is in a sleep mode or low-power state causes the handheld computer to wake up and execute the application that is pre-assigned to that application button. If the handheld computer is, however, in a powered-up state, but operating a first application, actuation of an application button 114 associated with a second application will cause the second application to be executed in place of the first application. Other examples of using application buttons 114 to execute pre-assigned applications are described in U.S. Pat. No. 5,900,875, and in U.S. patent application Ser. No. 09/272,979, both of which are hereby incorporated by reference in their entirety.

If in step 315 the determination is that a menu is active, then step 330 provides that actuation of the application button 114 causes the handheld computer 100 to determine a menu function assigned to that button. Menu functions include interpreting actuation as navigation input, in either lateral or vertical directions, or as selection input for selecting a menu bar or menu item that has been made selectable. Configurations for using application buttons 114 to navigate and select menu items are described below.

In step 335, the menu function assigned to the actuated application button 114 is performed in response to actuation of that application button 114.

For example, under a configuration for use with an embodiment such as described with FIG. 3, the processor 440 (FIG. 4) may assign all menu functions for operating the menus to the application buttons 114 and navigation buttons 116. These menu functions may include navigation functions for two lateral and two vertical directions, menu item selection, and menu cancellation functions. Each menu function for interpreting actuation as selection input or navigation input would be assigned to one of the application buttons 116 or navigation buttons 114. In one configuration, one of the application buttons 114 appearing to the left of the navigation buttons 116 may be assigned a left navigation menu function. When that application button 114 is pressed, an adjacent left menu is made active in place of another menu that was active prior to the button being pressed. If the left-most menu is active, and the left navigation menu function is performed, the far right menu may be made active. One of the application buttons 114 appearing to the right of the navigation buttons 116 may similarly be assigned a right navigation function. Of the two remaining application buttons 114, one may be assigned a select-to-cancel function. This button's actuation will cancel the menu that is active on the display 120. Another of the application buttons 114 may be assigned the menu function for selecting menu items for active menus. It may also be used for the menu function of selecting the menu bar after when the menu bar of an active menu is made selectable through navigation input, thereby removing the need for a separate select-to-cancel menu function button. The two navigation buttons 114 may be used to scroll vertically, upwards or downwards, when one of the menus is made active on display 120.

Among other advantages, embodiments such as described with FIG. 3 provide a means for enabling a user to operate and cancel active menus, without having to tap or make contact with the display. In the realm of handheld computers, this means that once a menu has been made active, the user does not have to hold a stylus and make contact with the display 120 in order to perform all menu functions necessary for operating and canceling an active menu.

E. Hardware Diagram

Figure 4:
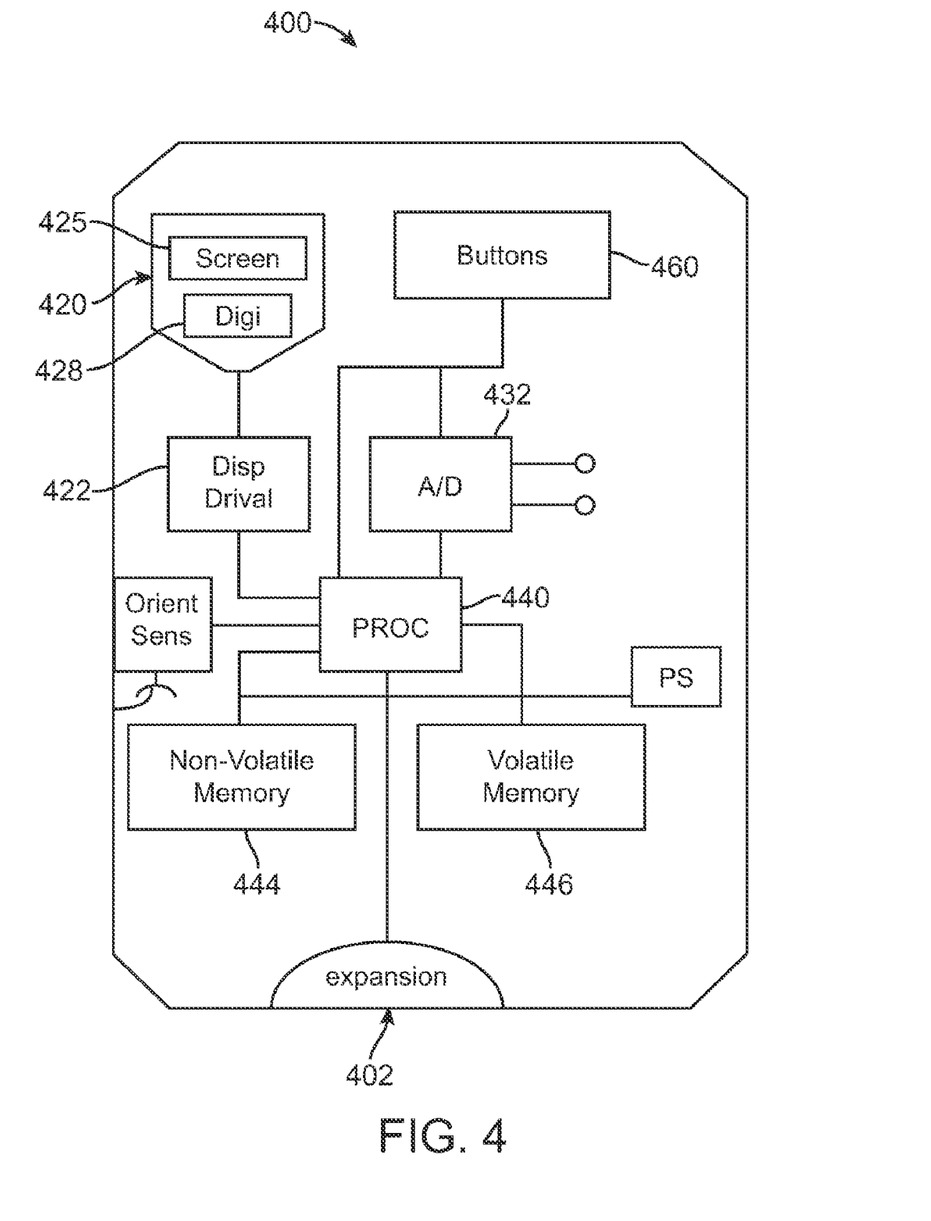
FIG. 4 is a hardware diagram of a handheld computer for use with an embodiment of the invention.

FIG. 4 is a block diagram for a handheld computer 400 for use with an embodiment of the invention.

In an embodiment, handheld computer includes a processor 440 coupled to a first memory 444 (non-volatile) and a second memory 446 (volatile). The processor 440 is coupled to a display driver 422. The processor 440 combines with display driver 422 to process and signal data for presentation on a display assembly 420. The display assembly 420 includes a screen 425 and digitizer 428. The display assembly 420 may be illuminated to display menus, as described by FIG. 1. The digitizer 428 may couple to processor 440 to enable users to enter requests to view menus. A set of buttons 460 is also coupled to the processor 440 for purpose of receiving input, including navigation and selection input.

For example, a user may request to view one of the menus by tapping a display object in the vicinity of the menu of interest. The display object may correspond a menu bar. The digitizer 428 couples to processor 440 to detect when the display object is tapped. The processor 440 then makes that menu active. Subsequently, buttons 460 may, as described elsewhere in the application, be actuated to navigate the menu, to select menu items, and to cancel active menus. The selection input may cause the activation of the menu to be cancelled.

An analog-digital (AD) converter 432 is coupled to processor 440. One or more channels from A/D converter 432 maybe used to convert analog input provided by the digitizer 428, or by another analog input mechanism.

The handheld computer 400 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, an expansion port 402 enables one or more types of expansion modules to be connected to processor 440. The handheld computer 400 may also include additional expansion ports.

The type of accessory devices that may be coupled to the handheld computer 400 via expansion port 402 may be identified by primary functions of their internal components. Each accessory device may include one or more of the following set of components: a radio-frequency transmitter and/or receiver, a processor, an input mechanism, additional memory, a battery, and/or another A/D converter.

F. Alternative Embodiments

While some embodiments described herein provide for an initial menu to be made active using a screen-tap, other embodiments may use an actuatable mechanism, such as a button, to launch menus.

Furthermore, while some embodiments describe buttons dedicated for a particular navigation or selection function, other embodiments may use a more limited number of buttons to perform the same functions. Operations of one button (or other actuatable mechanism) may be varied to cause different menu functions to be performed. For example, a single tap may be interpreted as a menu item select function, and a double-tap may be interpreted as a cancel menu function.

While an embodiment described with FIG. 3 describes use of buttons, other embodiments may use other actuation mechanisms to perform both application and navigation functions. For example, virtual or display icons may be used instead of buttons. Contact-sensitive surfaces that act as buttons may also be used.

G. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A portable computing device comprising:
a housing;
a display accessible on a panel of the housing;
a multi-directional input mechanism that includes one or more of a button feature, protruding pad, or protruding member; and
a processor coupled to the display and to the multi-directional input mechanism, the processor being configured to:
detect an input signaled from the multi-directional input mechanism corresponding to a menu request;
activate a first menu on the display in response to the menu request, the activated first menu displaying a menu bar and one or more menu items, wherein the menu bar corresponds to a portion of the first menu that provides an identifier of the first menu when the first menu is both active and inactive, and wherein when the first menu is active, each of the one or more menu items is associated with an action;
process navigation input signaled from the multi-directional input mechanism to navigate vertically from one of the one or more menu items in the active first menu to the portion of the active first menu that corresponds to the menu bar of the active first menu, so that the menu bar of the active first menu to be selectable;
process selection input signaled from tile multi-directional input mechanism for when the menu bar is selectable; and cancel activation of the first menu from the display in response to (i) the menu bar of the first menu being selectable and (ii) the selection input for the menu bar being processed.

2. The portable computing device of claim 1, wherein the processor is configured to execute an application that makes only the first menu available while a corresponding page of the application is being displayed on the display, and to process a lateral navigation input signaled from the multi-directional input mechanism while the first menu is active in order to cancel the first menu from being active.

3. The portable computing device of claim 1, wherein the processor is configured to process navigation input signaled from the multi-directional input mechanism to navigate laterally from the first menu to the second menu in order to make the second menu active instead of the first menu, and wherein the processor is configured to automatically make a menu bar of the second menu selectable in response to the second menu being activated by the lateral navigation input.

4. The portable computing device of claim 3, wherein the processor is configured to process navigation input signaled from the multi-directional input mechanism to cause the menu bar of the second menu item to be selectable immediately upon the second menu being made active in response to the lateral navigation input, and wherein the processor is configured to cancel activation of the second menu from the display in response to the menu bar of the second menu being selected by the selection input.

5. The portable computing device of claim 1, wherein the processor is configured to process the navigation input signaled from the multi-directional input mechanism to make the menu bar highlighted for selection by the selection input.

6. The portable computing device of claim 1, wherein the processor is configured to process navigation input signaled from the multi-directional input mechanism to navigate from one of the one or more menu items of the first menu to the menu bar in order to make the menu bar selectable.

7. The portable computing device of claim 1, wherein the processor is configured to navigate laterally from the first menu to a second menu in response to receiving lateral navigation input signaled from the multi-directional input mechanism, and to make the menu bar of the active second menu bar selectable upon navigating to the second menu.

8. The portable computing device of claim 7, wherein the processor is configured to process selection input when the menu bar of the second menu is made selectable in order to select that menu bar and cause cancellation of the second menu being active.

9. The portable computing device of claim 1, wherein the processor navigates to the menu bar by highlighting the menu bar.

10. The portable computing device of claim 1, wherein the processor is configured to perform an action in response to one of the menu items of the first menu being selected.

11. The portable computing device of claim 1, wherein the multi-directional input mechanism is selected from a group of user-interactive features consisting of a joy stick, a joy pad, and a set of scroll buttons.

12. A portable computing device comprising:
a housing;
a display accessible on a panel of the housing;
a set of actuatable mechanisms provided on the housing, the set of actuatable mechanisms that include one or more of a button feature, protruding pad, or protruding member; and
a processor coupled to the display and to the plurality of actuatable mechanisms, the
processor being configured to: detect an input corresponding to a menu request; in response to detecting the input corresponding to the menu request, assign a menu function to each actuatable mechanism in the set of actuatable mechanisms; and
display one or more sets of menu items that are active in response to the menu request, each of the one or more sets of menu items being displayed as at least a portion of a menu having a menu bar and one or more menu items, wherein the menu bar corresponds to a portion of the menu that provides an identifier of the menu when the menu is both active and inactive, and wherein when the menu is active, each of the one or more menu items is associated with an action;
while the one or more sets of menu items for at least the portion of the menu are active, process input corresponding to actuation of any one of the actuatable mechanisms as the menu function assigned to the actuated mechanism, wherein the processor is configured to display the menu bar with each of the one or more sets of menu items in response to receiving the menu request, and wherein the processor is configured to cancel activation of the one or more sets of menu items in response to (i) navigation input to navigate vertically to one of the one or more menu items in the active menu to the menu bar in order to cause the portion of the menu corresponding to the menu bar to be in a selectable state, and (ii) selection input for selecting the menu bar from the selectable state.

* * * * *